United States Patent
Kulkarni et al.

(10) Patent No.: US 10,590,324 B2
(45) Date of Patent: Mar. 17, 2020

(54) FIBER SUSPENDING AGENT FOR LOST-CIRCULATION MATERIALS

(71) Applicant: Halliburton Energy Services, Inc., Houston, TX (US)

(72) Inventors: Sandeep D. Kulkarni, Houston, TX (US); Matthew L. Miller, Houston, TX (US); Dale E. Jamison, Houston, TX (US); Kushabhau D. Teke, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/168,575

(22) Filed: Oct. 23, 2018

(65) Prior Publication Data

US 2019/0055445 A1 Feb. 21, 2019

Related U.S. Application Data

(62) Division of application No. 15/028,366, filed as application No. PCT/US2013/071767 on Nov. 25, 2013, now Pat. No. 10,138,405.

(51) Int. Cl.
| | |
|---|---|
| *C09K 8/035* | (2006.01) |
| *C09K 8/50* | (2006.01) |
| *C09K 8/514* | (2006.01) |
| *E21B 21/00* | (2006.01) |
| *E21B 33/138* | (2006.01) |
| *E21B 33/14* | (2006.01) |
| *E21B 43/16* | (2006.01) |
| *E21B 43/25* | (2006.01) |
| *E21B 43/26* | (2006.01) |

(52) U.S. Cl.
CPC ............. *C09K 8/035* (2013.01); *C09K 8/50* (2013.01); *C09K 8/514* (2013.01); *E21B 21/003* (2013.01); *E21B 33/138* (2013.01); *C09K 2208/08* (2013.01); *E21B 33/14* (2013.01); *E21B 43/16* (2013.01); *E21B 43/25* (2013.01); *E21B 43/26* (2013.01)

(58) Field of Classification Search
CPC ...... C09K 2208/08; C09K 8/035; C09K 8/50; C09K 8/514; E21B 21/003; E21B 33/138; E21B 33/14; E21B 43/16; E21B 43/25; E21B 43/26

See application file for complete search history.

(56) References Cited

U.S. PATENT DOCUMENTS

| | | |
|---|---|---|
| 4,502,969 A | 3/1985 | Shell |
| 6,085,844 A | 7/2000 | Palmer et al. |
| 2009/0054269 A1 | 2/2009 | Chatterji et al. |
| 2011/0017464 A1 | 1/2011 | Ali et al. |
| 2013/0035265 A1 | 2/2013 | Daccord |

OTHER PUBLICATIONS

International Search Report and Written Opinion dated Aug. 26, 2014; International PCT Application No. PCT/US2013/071767.
Rajabian, Mahmoud, Charles Dubois, and Miroslav Grmela. "Suspensions of semiflexible fibers in polymeric fluids: rheology and thermodynamics." Rheologica acta 44.5 (2005): 521-535.
Ahmed, Ramadan M., and Nicholas E. Takach. "Fiber sweeps for hole cleaning." SPE drilling & completion 24.04 (2009): 564-573.
Chhabra, Raj P. Bubbles, drops, and particles in non-Newtonian fluids. CRC press, 2006; 129-130.

*Primary Examiner* — Frances Tischler
(74) *Attorney, Agent, or Firm* — McGuireWoods LLP

(57) ABSTRACT

A treatment fluid comprises: a base fluid; a lost-circulation material, wherein the lost-circulation material inhibits or prevents some or all of the treatment fluid from penetrating into a subterranean formation from a wellbore, wherein the wellbore penetrates the subterranean formation; and a suspending agent, wherein the suspending agent consists of a plurality of fibers, and wherein the suspending agent provides a lost-circulation material distribution of at least 30% for a test treatment fluid consisting essentially of the base fluid, the lost-circulation material, and the suspending agent at the temperature of a lost-circulation zone of the subterranean formation and static aging for at least 1 hour.

20 Claims, No Drawings

FIBER SUSPENDING AGENT FOR LOST-CIRCULATION MATERIALS

TECHNICAL FIELD

Suspending agents can be used to uniformly distribute insoluble particles throughout a base fluid. The type of suspending agent and the properties of the suspending agent can be used to determine the suspendability of a suspending agent. The treatment fluid including the suspending agent can be used in oil or gas operations.

DETAILED DESCRIPTION

As used herein, the words "comprise," "have," "include," and all grammatical variations thereof are each intended to have an open, non-limiting meaning that does not exclude additional elements or steps. As used herein, the words "consisting essentially of," and all grammatical variations thereof are intended to limit the scope of a claim to the specified materials or steps and those that do not materially affect the basic and novel characteristic(s) of the claimed invention. For example, a test treatment fluid can consist essentially of the base fluid, the lost-circulation material, and the suspending agent. The test treatment fluid can contain other ingredients so long as the presence of the other ingredients does not materially affect the basic and novel characteristics of the claimed invention, i.e., so long as the test treatment fluid exhibits the desired lost-circulation material distribution.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas, a heterogeneous fluid has more than one distinct phase. A suspension is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase. A heterogeneous fluid will have only one continuous phase, but can have more than one dispersed phase. It is to be understood that any of the phases of a heterogeneous fluid (e.g., a continuous or dispersed phase) can contain dissolved or undissolved substances or compounds. As used herein, the phrase "aqueous-based" means a solution wherein an aqueous liquid is the solvent or a colloid wherein an aqueous liquid is the continuous phase. As used herein, the phrase "oil-based" means a solution wherein a hydrocarbon liquid is the solvent or a colloid wherein a hydrocarbon liquid is the continuous phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, or an injection well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wall of the wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The drilling fluid may be circulated downwardly through the drilling pipe, and back up the annulus between the wellbore and the outside of the drilling pipe. During drilling or other operations such as completion, some of the base liquid of the treatment fluid can undesirably flow into the subterranean formation instead of remaining in the wellbore and being circulated back up to the wellhead. This is known as lost circulation. In order to overcome the problems associated with lost circulation, a lost-circulation material ("LCM") can be used. LCMs can be swellable or non-swellable, granular-shaped substances. As the treatment fluid is placed into the well, the LCM can eliminate or lessen the amount of liquid base fluid entering the subterranean formation. For example, the particles of the LCM can build upon each other and form a bridge over highly-permeable areas of the formation, such as natural fissures, fractures, and vugs, or induced fractures. The bridge can eliminate or reduce the amount of liquid base fluid entering the formation via the wellbore.

There is a need for improved suspending agents that can be used to suspend LCMs in a treatment fluid. It has been discovered that fibers can be added to a treatment fluid as a suspending agent for LCMs. The suspendability of the fibers can be experimentally determined in a laboratory.

It is to be understood that if any laboratory test (e.g., LCM Distribution) requires the test be performed at a specified temperature and possibly a specified pressure, then the temperature and pressure of the test composition is ramped up to the specified temperature and pressure after being mixed at ambient temperature and pressure. For example, the composition can be mixed at 71° F. (22° C.) and 1 atm (0.1 MPa) and then placed into the testing apparatus and the temperature of the composition can be ramped up to the specified temperature. As used herein, the rate of ramping up the temperature can be in the range of about 1° F./min to about 10° F./min to simulate actual wellbore conditions. After the composition is ramped up to the specified temperature and possibly specified pressure, the composition is maintained at that temperature and pressure for the duration of the testing.

As used herein, the "LCM Distribution" test was performed as follows. The base fluid was hot rolled at the specified temperature for a specified period of time under a specific pressure. The base fluid can include a multitude of ingredients and can be, for example, a drilling mud. The treatment fluid was then mixed by first adding the hot-rolled base fluid to a mixing container. The lost-circulation material "LCM" and the suspending agent fibers were added to the base fluid. The fluid was then mixed thoroughly using a spatula. The mixture was then heated to the specified temperature at ambient pressure (~1 atm). The mixture was then poured into a glass vessel that was pre-heated to the specified temperature. The glass vessel containing the mixture was then placed into a pre-heated stainless steel aging cell. The mixture was then static aged for 2 hours at the specified temperature. The glass vessel was then placed into a water bath for about 10 minutes (min) to cool down. The mixture in the glass vessel was then separated into two equal sections, the top half and the bottom half. The quantity of LCM in each half was obtained by filtering each mixture half through an appropriately sized mesh depending on the particle size of the LCM added to the base fluid. The LCM particulates and fibers were rinsed with water or base oil to remove any adhered base fluid. The LCM and fibers from each half were dried in an oven at 221° F. (105° C.), then cooled, and then weighed. The following equation was used to determine the LCM Distribution.

$$\% \ LCM^{Top} = \frac{LCM^{Top}}{LCM^{Top} + LCM^{Bottom}} * 100$$

where $LCM^{Top}$ is the weight of LCM in the top half and $LCM^{Bottom}$ is the weight of the LCM in the bottom half. It should be noted that the fibers can be separated from the LCM and just the LCM can be weighed or both the LCM plus the fibers can be weighed in which case the preceding equation would include the weight of the LCM plus the fibers in each half. An LCM Distribution of 50% indicates that zero settling occurred because 50% of the LCM (and optionally the fibers too) still remains in the top half of the fluid. By contrast, an LCM Distribution of 0% indicates that all of the LCM settled to the bottom half of the fluid. As used herein, an LCM Distribution between 40% to 50% is considered excellent suspendability, greater than or equal to 30% is considered a stable fluid, 5% to 30% is considered weak suspendability, and <5% is considered no suspendability.

According to an embodiment, a treatment fluid comprises: a base fluid; a lost-circulation material, wherein the lost-circulation material inhibits or prevents some or all of the treatment fluid from penetrating into a subterranean formation from a wellbore, wherein the wellbore penetrates the subterranean formation; and a suspending agent, wherein the suspending agent consists of a plurality of fibers, and wherein the suspending agent provides a lost-circulation material distribution of at least 30% for a test treatment fluid consisting essentially of the base fluid, the lost-circulation material, and the suspending agent at the temperature of a lost-circulation zone of the subterranean formation and static aging for at least 1 hour.

According to another embodiment, a method of treating a portion of wellbore comprises: introducing the treatment fluid into the portion of the wellbore.

The discussion of preferred embodiments regarding the treatment fluid or any ingredient in the treatment fluid, is intended to apply to all of the composition embodiments and method embodiments. Any reference to the unit "gallons" means U.S. gallons.

It is to be understood that while the treatment fluid can contain other ingredients, it is the suspending agent that is primarily or wholly responsible for providing the requisite LCM distribution and a stable treatment fluid. For example, a test treatment fluid consisting essentially of, or consisting of, the base fluid, the LCM, and the suspending agent and in the same proportions as the treatment fluid can have a desirable LCM distribution. Therefore, it is not necessary for the treatment fluid to include other additives, such as a viscosifying agent or other suspending agents to provide for the desired LCM distribution and stable fluid. It is also to be understood that any discussion related to a "test treatment fluid" is included for purposes of demonstrating that the treatment fluid can contain other ingredients, but it is the suspending agent that creates the desirable LCM distribution and stable fluid. Therefore, while it may not be possible to perform a test in a wellbore for the specific treatment fluid, one can formulate a test treatment fluid to be tested in a laboratory to identify if the ingredients and concentration of the ingredients will provide the stated LCM distribution.

The treatment fluid includes a base fluid. The treatment fluid can be a heterogeneous fluid, for example, a slurry or an emulsion or invert emulsion. Any of the phases of the heterogeneous fluid can contain dissolved substances and/or undissolved substances. The base fluid can be the liquid continuous phase of the heterogeneous fluid. The base fluid can be an aqueous liquid, an aqueous miscible liquid, or a hydrocarbon liquid. Suitable aqueous-based fluids can include, but are not limited to, fresh water; saltwater (e.g., water containing one or more water-soluble salts dissolved therein); brine (e.g., saturated salt water); seawater; and any combination thereof. Suitable aqueous-miscible fluids can include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, magnesium chloride, potassium chloride, sodium bromide, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof.

The hydrocarbon liquid can be synthetic. The hydrocarbon liquid can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins-based drilling fluids include, ENCORE® drilling fluid and ACCOLADE® internal olefin and ester blend drilling fluid, marketed by Halliburton Energy Services, Inc. An example of a diesel oil-based drilling fluid is INVERMUL®, marketed by Halliburton Energy Services, Inc.

The treatment fluid includes a lost-circulation material ("LCM"), wherein the LCM inhibits or prevents some or all of the treatment fluid from penetrating into a subterranean formation, wherein the wellbore penetrates the subterranean formation. The LCM can be of any material known in the art suitable for use as an LCM in a wellbore operation. Depending on the size of the pores of the subterranean formation and the size of the bridges formed by the LCM, the bridges can help inhibit or prevent fluid flow from the wellbore into the formation or also from the formation into the wellbore (depending on the specific oil or gas operation being performed). It should be understood that while some of the treatment fluid may penetrate into the subterranean formation, the majority of the treatment fluid should remain in the wellbore. Moreover, as used herein, the term "penetrate" and all grammatical variations thereof is not intended to preclude some penetration of a certain depth, for example, a few inches, into the formation, but rather is meant to include penetration of depths that would be considered in the industry as lost circulation, and could likely impair oil or gas operations or increase the cost of performing the oil or gas operation. According to an embodiment, the LCM is in at least a sufficient concentration such that fluid is inhibited or prevented from flowing into the formation from the wellbore. The LCM can be in a concentration in the range of about 0.5 to about 200 pounds per barrel of the base fluid or about 0.5% to about 50% by volume of the base fluid.

Suitable LCMs include, but are not limited to: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof. Examples of suitable commercially-available LCMs include, but are not limited to, WALL-NUT®, BARAC-ARB®, STEELSEAL®, N-SQUEEZE™, N-SEAL™, N-PLEX™, HYDRO-PLUG®, DURO-SQUEEZE™ H, BAROFIBRE®, and BAROFIBRE® O, marketed by Halliburton Energy Services, Inc.

The particles of the LCM can be formed by the combination of one or more types of LCM materials using a consolidating agent. Suitable consolidating agents may include, but are not limited to: non-aqueous tackifying agents; aqueous tackifying agents; emulsified tackifying agents; silyl-modified polyamide compounds; resins; cross-linkable aqueous polymer compositions; polymerizable organic monomer compositions; consolidating agent emulsions; zeta-potential modifying aggregating compositions; silicon-based resins; and binders. Combinations and/or derivatives of these may also be suitable. It is within the ability of one of ordinary skill in the art, with the benefit of this disclosure, to determine the type and amount of consolidating agent to include to achieve the desired results.

The LCM particles can be of any size or shape combination compatible with the specifics of the wellbore and subterranean formation that is penetrated by the wellbore. The LCMs can be substantially spherical or substantially non-spherical in shape, and can also be hollow. The LCM particles can be, for example, spherical-shaped; cubic-shaped; rod-shaped; cone-shaped; ellipse-shaped; cylinder-shaped; polygon-shaped; pyramid-shaped; torus-shaped; cross-shaped; lattice-shaped; star-shaped; or any other shape. The LCM particles can be of any size required for use in the particular subterranean formation. According to an embodiment, the LCM can have a particle size distribution such that at least 80% of the LCM particles have a size in the range from about 2 to about 400 mesh, U.S. Sieve Series, preferably about 8 to about 400 mesh, more preferably about 8 to about 120 mesh. The LCM particles can range in sphericity from about 0 to about 1, preferably about 0.1 to about 1. LCM particles that are substantially non-spherical (e.g., particles having sphericity values at least below 1) can have a length to diameter aspect ratio in the range of about 1:1 to about 10:1.

The treatment fluid also includes a suspending agent. The suspending agent consists of a plurality of fibers. The fibers can be in dry form or in a liquid suspension. The fibers can be natural, synthetic, biodegradable, and/or biocompatible. Examples of synthetic fibers include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly(3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. Examples of other suitable fibers include, fibers of cellulose including viscose cellulosic fibers, oil coated cellulosic fibers, and fibers derived from a plant product like paper fibers; carbon including carbon fibers; melt-processed inorganic fibers including basalt fibers, wollastonite fibers, non-amorphous metallic fibers, ceramic fibers, and glass fibers. The fibers can also be a composite fiber made from any combination of the preceding materials. There can also be a mixture of fibers wherein the fibers are composed of different substances. A commercially-available example of suitable fibers is BAROLIFT®, sweeping agent, marketed by Halliburton Energy Services, Inc., which is a synthetic fiber. The fibers can have a fiber length, diameter and have a concentration. The fibers can have a length to diameter aspect ratio in the range of about 2:1 to about 5,000:1.

The suspending agent provides a lost-circulation material distribution of at least 30% for a test treatment fluid consisting essentially of the base fluid, the LCM, and the suspending agent at the temperature of a lost-circulation zone of the subterranean formation and static aging for at least 1 hour. As used herein, the term "lost-circulation zone" means the location in the wellbore where lost-circulation is occurring and needs to be treated with the treatment fluid. There can be more than one lost-circulation zone within the wellbore. More preferably, the suspending agent provides an LCM distribution of at least 40%, more preferably 50% at the stated testing conditions, wherein an LCM distribution of 50% indicates zero settling of the LCM particles in the base fluid.

The suspending agent can be in a concentration in the range of about 0.1 pounds per barrel (ppb) to about 25 ppb of the base fluid. According to another embodiment, the suspending agent is in at least a sufficient concentration such that the suspending agent provides a lost-circulation material distribution of at least 30%, preferably at least 40%, more preferably 50%, for a test treatment fluid consisting essentially of the base fluid, the LCM, and the suspending agent at the temperature of a lost-circulation zone of the subterranean formation and static aging for at least 1 hour.

The fibers can have a fiber length. The fibers can have a distribution such that at least 90% of the fibers have a length in the range of about 0.5 millimeters (mm) to about 25 mm. According to another embodiment, the fibers have a length such that the suspending agent provides a lost-circulation material distribution of at least 30%, preferably at least 40%, more preferably 50%, for a test treatment fluid consisting essentially of the base fluid, the LCM, and the suspending agent at the temperature of a lost-circulation zone of the subterranean formation and static aging for at least 1 hour.

The fiber length and concentration may be inversely proportional. For example, for a given concentration of fibers, the desired LCM distribution may be achieved by increasing the fiber length. By contrast, for a given fiber length, the desired LCM distribution may be achieved by increasing the concentration of the fibers.

The treatment fluid can be any fluid used in an oil or gas operation where prevention of lost circulation is desirable. For example, the treatment fluid can be, without limitation, a drilling fluid, spacer fluid, completion fluid, fracturing fluid, or acidizing fluid.

The treatment fluid can also contain other ingredients, such as a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

The viscosifiers can comprise any substance (e.g., a polymeric material) capable of increasing the viscosity of the treatment fluid. In certain embodiments, the viscosifier can comprise one or more polymers that have at least two molecules that are capable of forming a crosslink in a cross-linking reaction in the presence of a crosslinking agent, and/or polymers that have at least two molecules that are so cross-linked (i.e., a cross-linked viscosifier). The viscosifiers can be naturally-occurring; synthetic; or a combination thereof. The viscosifiers of the present invention may also be cationic; anionic; or a combination thereof. Suitable viscosifiers for use in the treatment fluids of the present invention include, but are not limited to, polysaccharides; biopolymers; and/or derivatives thereof that contain one or more of these monosaccharide units: galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and combinations thereof.

Suitable synthetic polymers for use as a viscosifier in the treatment fluids include, but are not limited to, 2,2'-azobis (2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido- and methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the viscosifier can comprise an acrylamide/2-(methacryloyloxy)ethyltrimethylammonium methyl sulfate copolymer. In certain embodiments, the viscosifier can comprise an acrylamide/ 2-(methacryloyloxy)ethyltrimethylammonium chloride copolymer. In certain embodiments, the viscosifier can comprise a derivatized cellulose that comprises cellulose grafted with an allyl or a vinyl monomer. Additionally, polymers and copolymers that comprise one or more functional groups, such as, for example, hydroxyl; cis-hydroxyl; carboxylic acids; derivatives of carboxylic acids; sulfate; sulfonate; phosphate; phosphonate; amino; or amide groups may be used as viscosifiers. An example of a commercially-available viscosifier is BARAZAN® D PLUS, marketed by Halliburton Energy Services, Inc.

The viscosifier can be present in the treatment fluids in a concentration sufficient to provide the desired viscosity. In certain embodiments, the viscosifier(s) can be present in a concentration in the range of from about 0.1 to about 40 ppb of the base fluid, preferably about 0.1 to about 15 ppb of the base fluid.

The treatment fluid can also include one or more crosslinking agents. Examples of suitable crosslinking agents include, but are not limited to, metal ions; borate ions;

magnesium ions; zirconium IV ions; titanium IV ions; aluminum ions; antimony ions; chromium ions; iron ions; copper ions; magnesium ions; zinc ions; and any combination thereof. These ions may be provided by providing any compound that is capable of producing one or more of these ions, such as, for example, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combination thereof. The choice of a particular cross-linking agent will be governed by several considerations that will be recognized by one skilled in the art including, but not limited to, the type of viscosifier(s) included, the molecular weight of the viscosifier(s), the conditions in the subterranean formation, the safety handling requirements, the pH of the treatment fluid, and so on.

When included, suitable cross-linking agents can be in a concentration sufficient to provide the desired degree of cross-linking between molecules of the viscosifier. In certain embodiments, the cross-linking agent is in a concentration in the range from about 0.01 to about 10 ppb of the base fluid, preferably about 0.5 to about 5 ppb of the base fluid.

Suitable filtration control agents can comprise any substance capable of managing filtration, including bridging, bonding, deflocculation, and viscosity. The filtration control agents can also function to reduce filter cake permeability. Suitable filtration control agents include, but are not limited to, polyanionic cellulose; polyacrylate; modified lignite; powdered resin; modified starch; carboxymethylcellulose; and any combination thereof. Suitable commercially-available filtration control agents include PAC™-R and DEX-TRID®, marketed by Halliburton Energy Services, Inc. The filtration control agent can be in a concentration in the range of about 0.1 to about 20 ppb of the treatment fluid, preferably about 0.1 to about 5 ppb of the treatment fluid.

Suitable shale stabilizers can include, but are not limited to, long chain alcohols; polyols; polyglycols; amine inhibitor; sodium or potassium silicate; partially hydrolyzed polyacrylamides; polyalkene glycols; anionic surfactants; salt solutions containing, for example, sodium chloride, potassium chloride, or ammonium chloride; cationic polymers and oligomers, for example, poly(dimethyldiallylammonium chloride), cationic poly(acrylamide) and cationic poly(dimethylaminoethylmethacrylate); and any combination thereof. Examples of commercially-available shale stabilizers include CLAY SYNC™, CLAYSEAL® PLUS, PERFORMATROL®, GEM™ GP, GEM™ CP, BORE-HIB®, BARO-TROL® PLUS, EZ-MUD®, EZ-MUD® GOLD, and BARASIL™-S, marketed by Halliburton Energy Services, Inc. The shale stabilizer can be in a concentration in the range of about 0.1 to about 30 ppb of the treatment fluid, preferably about 1 to about 15 ppb of the treatment fluid.

The weighting agent can be any material capable of increasing the density of the treatment fluid. The weighting agent can additionally aid in controlling formation pressures and stabilizing the wellbore. Suitable weighting agents include, but are not limited to, barite; hematite; ilmentite; manganese tetraoxide; galena; calcium carbonate; iron oxide; manganese oxide; magnetite; siderite; celesite; dolomite; manganese carbonate and any combination thereof. Examples of a commercially-available weighting agents include, but are not limited to, BAROID®, BARODENSE®, MICROMAX™, and combinations thereof, marketed by Halliburton Energy Services, Inc. The weighting agent can be in a concentration in the range of about 1 to about 1,500 ppb (about 4 to about 5,800 kilograms per cubic meter "$kg/m^3$") of the treatment fluid, preferably about 10 to about 700 ppb of the treatment fluid. According to another embodiment, the weighting agent is in at least a sufficient concentration such that the drilling fluid has a density in the range of about 9 to about 20 pounds per gallon (ppg) (about 1.078 to about 2.397 kilograms per liter "kg/L"). Preferably, the weighting agent is in at least a sufficient concentration such that the drilling fluid has a density in the range of about 9 to about 18 ppg (about 1.1 to about 2.4 kg/L).

Suitable pH buffers can be any pH buffer capable of controlling the pH of the treatment fluid (e.g., increasing or decreasing the pH). The pH buffers can be included in the treatment fluid to enhance the stability of the treatment fluid, for example. Suitable pH buffers can include, but are not limited to: sodium carbonate; potassium carbonate; sodium bicarbonate; potassium bicarbonate; sodium diacetate; potassium diacetate; ammonium diacetate; sodium phosphate; potassium phosphate; sodium hydrogen phosphate; potassium hydrogen phosphate; sodium dihydrogen phosphate; potassium dihydrogen phosphate; sodium borate; magnesium oxide; sulfamic acid; sodium hydroxide; potassium hydroxide; citric acid; tartaric acid; and any combination thereof. The pH buffer can be in at least a sufficient concentration to maintain the pH of the treatment fluid at a desired level. According to another embodiment, the pH buffer is in a concentration in the range of about 0.01 to about 10 ppb (about 0.04 to about 39 $kg/m^3$) of the treatment fluid, preferably about 0.1 to about 2 ppb (about 0.4 to about 8 $kg/m^3$) of the treatment fluid.

The treatment fluid can also include a friction reducer. Commercially-available examples of a suitable friction reducers include, but are not limited to, BARO-LUBE GOLD SEAL™, TORQ-TRIM® II, graphitic carbon, and combinations thereof, marketed by Halliburton Energy Services, Inc. The friction reducer can be in a concentration of at least 0.5 ppb (2 $kg/m^3$) of the drilling fluid. In an embodiment, the friction reducer is in a concentration in the range of about 0.5 to about 5 ppb (about 2 to about 19 $kg/m^3$) of the drilling fluid.

According to an embodiment, the methods include the step of introducing the treatment fluid into a portion of the wellbore. The well can be an oil, gas, or water production well, a geothermal well, or an injection well. The well includes the wellbore. The wellbore penetrates the subterranean formation. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The well can include an annulus. The step of introducing the treatment fluid can include introducing the treatment fluid into a portion of the annulus.

The methods can further include introducing a spacer fluid into the wellbore after the step of introducing the treatment fluid. The methods can also further include introducing a cement composition into the wellbore after the step of introducing the treatment fluid and/or the spacer fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion; foam cementing; primary or secondary cementing operations; well-plugging; and gravel packing. The cement composition can be in a pumpable state before and during introduction into the wellbore. The step of introducing can include introducing the cement composition into a portion of an annulus. Of course there can also be more than one treatment fluid introduced into a portion of the wellbore. The treatment fluids can be the same or different, for example, one treatment fluid can be a drilling fluid and another treatment fluid can be a spacer fluid, so long as each treatment fluid contains at least the base fluid, the LCMs, and the suspending agent.

The method embodiments can also include allowing the cement composition to set. The step of allowing can be performed after the step of introducing the cement composition into the wellbore. The method can further include perforating, fracturing, and/or performing an acidizing treatment after the step of allowing.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

Unless stated otherwise, the treatment fluids were tested according to the procedure for the specific test as described in The Detailed Description section above. Treatment fluid A had a density of 17 pounds per gallon (2.0 kilograms per liter) and included a NaCl brine as the base fluid; BARA-ZAN® D PLUS viscosifier at a concentration of 0.65 pounds per barrel of the treatment fluid (ppb); PAC™-R fluid loss additive at a concentration of 1 ppb; DEXTRID® filtration control agent at a concentration of 2 ppb; BAROID® weighting agent in a concentration sufficient to produce the 17 ppg density treatment fluid; and BARABUF® pH buffer in a concentration of 0.15 ppb.

Table 1 provides rheology, low-shear yield point "LSYP", and 10 second and 10 minute yield strength data for Treatment fluid A using a FANN 35 rheometer.

TABLE 1

| | Rheology | | | | | | LSYP (lb/100 sq. ft.) | 10 S/10 min gel strength (lb/100 sq. ft.) |
|---|---|---|---|---|---|---|---|---|
| rpm | 600 | 300 | 200 | 100 | 6 | 3 | 5 | 7/9 |
| Dial Reading (lb/100 sq. ft.) | 127 | 84 | 67 | 46 | 9 | 7 | | |

Table 2 contains fiber length in millimeters "mm," fiber concentration in pounds per barrel of Treatment fluid A "ppb," and LCM distribution data for the Treatment fluid A further containing an insoluble particulate of BARAC-ARB® lost-circulation material "LCM" at a concentration of between 4-5% by volume of Treatment fluid A and varying concentrations and fiber lengths of BAROLIFT® synthetic fiber as the suspending agent. BARACARB® lost-circulation material was ground marble having a particle size in the range of 1,400 to 1,680 micrometers and a density of 2.7 grams per cubic centimeter. The LCM distribution test was performed after hot rolling for 16 hours and static aging for 2 hours at a temperature of 150° F. (66° C.).

TABLE 2

| Fiber Length (mm) | Fiber Concentration (ppb) | LCM Distribution |
|---|---|---|
| 3 | 3 | 20.0% |
| 3 | 6 | 48.0% |
| 4 | 0.5 | 7.2% |
| 6 | 1 | 7.9% |
| 6 | 2 | 47.0% |
| 8 | 0.5 | 18.7% |
| 12 | 0.5 | 43.0% |

As can be seen in Table 2, fiber length and fiber concentration are inversely proportional. For example, for a given concentration, 0.5 ppb, the longer the fiber length, the better suspendability of the fibers. Also, for a given fiber length, 3 mm or 6 mm, an increase in concentration can yield a fluid with a desired LCM Distribution.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A system of treating a subterranean formation comprising:
    a pump; and
    a treatment fluid, wherein the treatment fluid comprises:
        a base fluid;
        a lost-circulation material, wherein the lost-circulation material inhibits or prevents some or all of the treatment fluid from penetrating into a subterranean formation from a wellbore, wherein the wellbore penetrates the subterranean formation; and
        a suspending agent, wherein the suspending agent consists of a plurality of fibers, wherein the fibers have a length to diameter aspect ratio of about 100:1 to about 5000:1, wherein the fibers have a distribution such that at least 90% of the fibers have a length in the range of about 5 to about 25 millimeters; and wherein the suspending agent is in at least a sufficient concentration to provide a lost-circulation material distribution of at least 30% for a test treatment fluid consisting essentially of the base fluid, the lost-circulation material, and the suspending agent at a temperature of a lost-circulation zone of the subterranean formation and after performing static aging for at least 1 hour; and
    wherein the pump pumps the treatment fluid into the subterranean formation.

2. The system according to claim 1, wherein the base fluid comprises an aqueous liquid, an aqueous miscible liquid, or a hydrocarbon liquid.

3. The system according to claim 1, wherein the lost-circulation material is in at least a sufficient concentration such that fluid is inhibited or prevented from flowing into the subterranean formation from the wellbore.

4. The system according to claim 1, wherein the lost-circulation material is in a concentration in the range of about 0.5 to about 200 pounds per barrel of the base fluid.

5. The system according to claim 1, wherein the lost-circulation material is selected from the group consisting of: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; ethylene vinyl acetate; a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof.

6. The system according to claim 1, wherein the lost-circulation material has a particle size distribution such that at least 80% of the lost-circulation material particles have a size in the range from about 2 to about 400 mesh.

7. The system according to claim 1, wherein the fibers are in dry form or in a liquid suspension.

8. The system according to claim 1, wherein the fibers are natural, synthetic, biodegradable, biocompatible, or combinations thereof.

9. The system according to claim 1, wherein the fibers are composed of polypropylene, polyaramid, polyester, polyacrylonitrile, polyvinyl alcohol, modified cellulose, chitosan, modified chitosan, polycaprolactone, polylactic acid, poly(3-hydroxybutyrate), polyhydroxy-alkanoates, polyglycolic acid, polylactic acid, polyorthoesters, polycarbonates, polyaspartic acid, polyphosphoesters, soya, copolymers thereof, and combinations thereof.

10. The system according to claim 1, wherein the suspending agent provides a lost-circulation material distribution of at least 40% for the test treatment fluid at the temperature of a lost-circulation zone of the subterranean formation and static aging for at least 1 hour.

11. The system according to claim 1, wherein the suspending agent is in a concentration in the range of about 0.1 ppb to about 25 ppb of the base fluid.

12. The system according to claim 1, wherein the treatment fluid further comprises one or more additional ingredients.

13. The system according to claim 12, wherein the additional ingredients are selected from the group consisting of a viscosifier; a filtration control agent; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

14. The system according to claim 13, wherein the additional ingredients comprise a viscosifier.

15. The system according to claim 1, wherein the treatment fluid is a drilling fluid, spacer fluid, completion fluid, fracturing fluid, or acidizing fluid.

16. The system according to claim 1, wherein the treatment fluid is a drilling fluid.

17. The system according to claim 16, wherein the drilling fluid comprises a weighting agent, wherein the weighting agent is in at least a sufficient concentration such that the drilling fluid has a density in the range of about 9 to about 20 pounds per gallon.

18. The system according to claim 1, wherein the wellbore is part of a well, and wherein the well is an oil, gas, water production well, a geothermal well, or an injection well.

19. The system according to claim 1, wherein the lost-circulation material is formed from a combination of one or more types of lost-circulation materials using a consolidating agent.

20. The system according to claim 1, wherein the system further comprises a drill string, and wherein the pump is configured to pump the treatment fluid through the drill string.

* * * * *